May 3, 1932.  J. WOLKOFF  1,856,147
ELECTRIC MOTOR
Filed Dec. 2, 1930  3 Sheets-Sheet 1
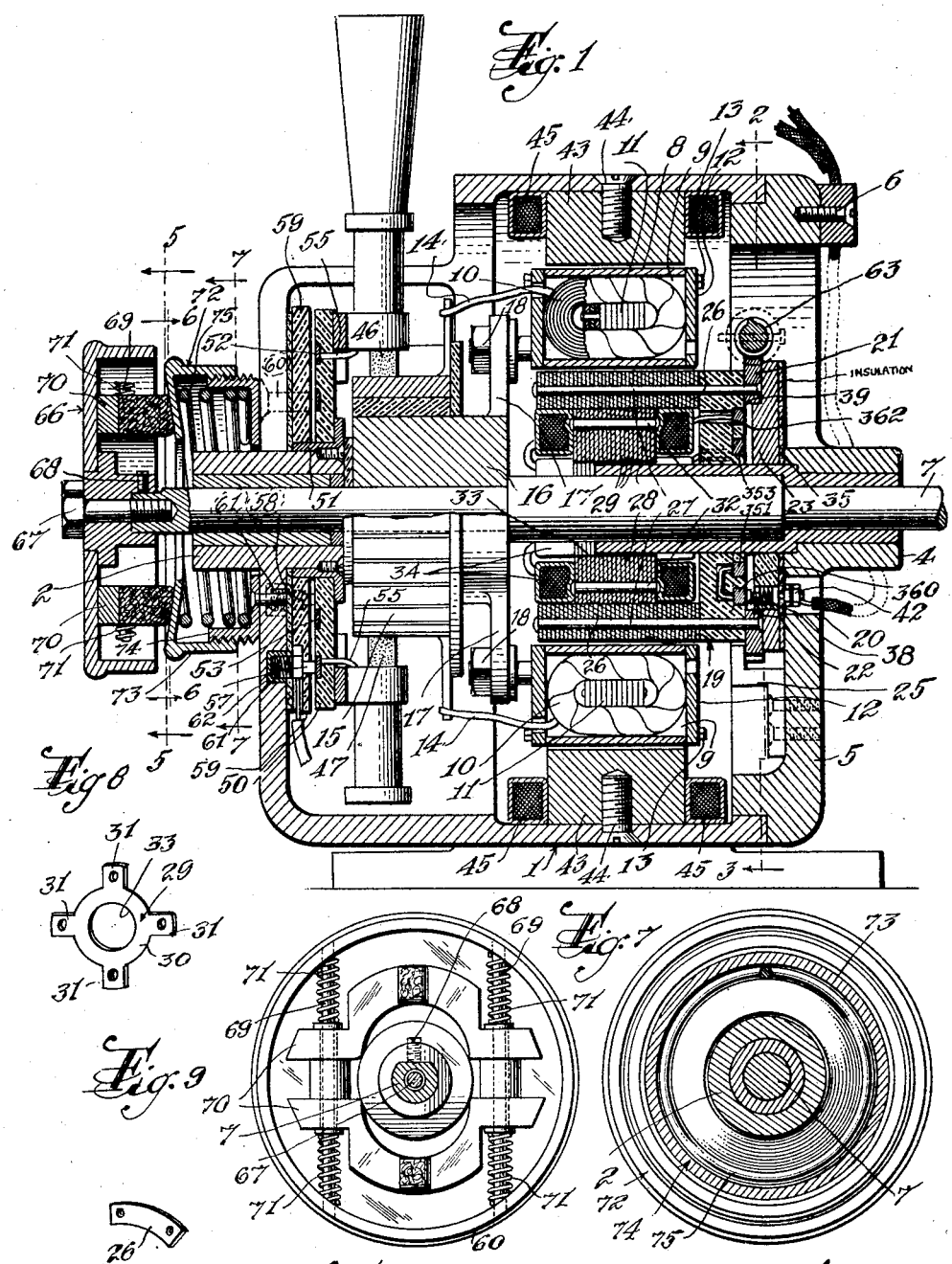

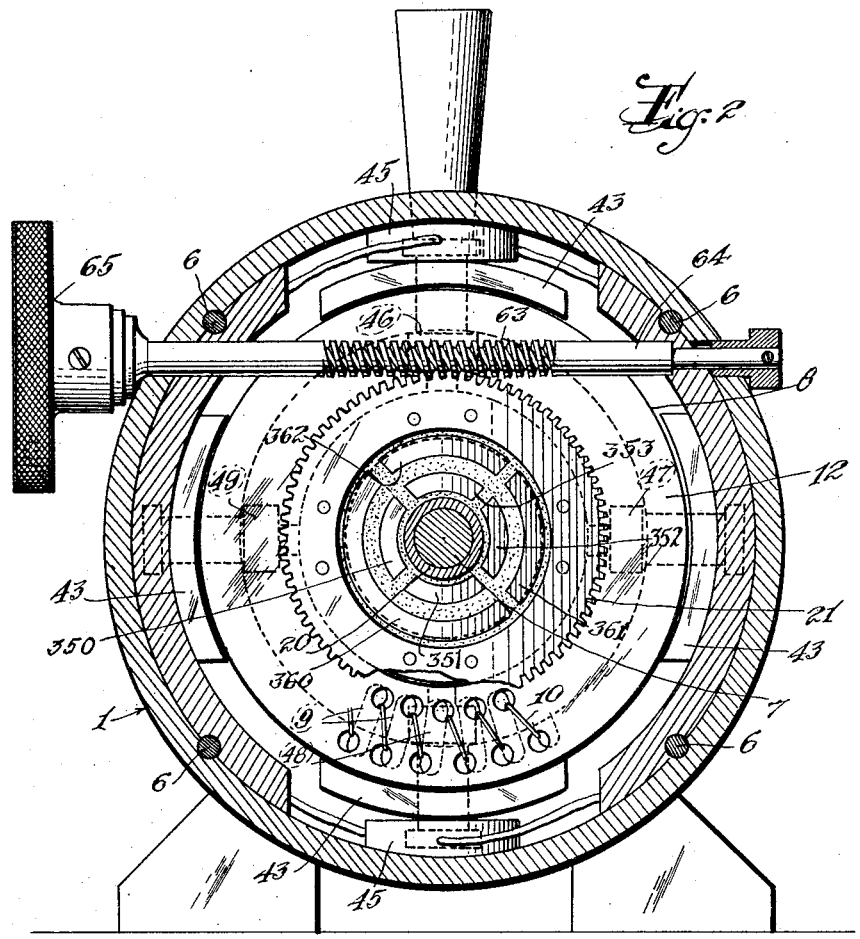
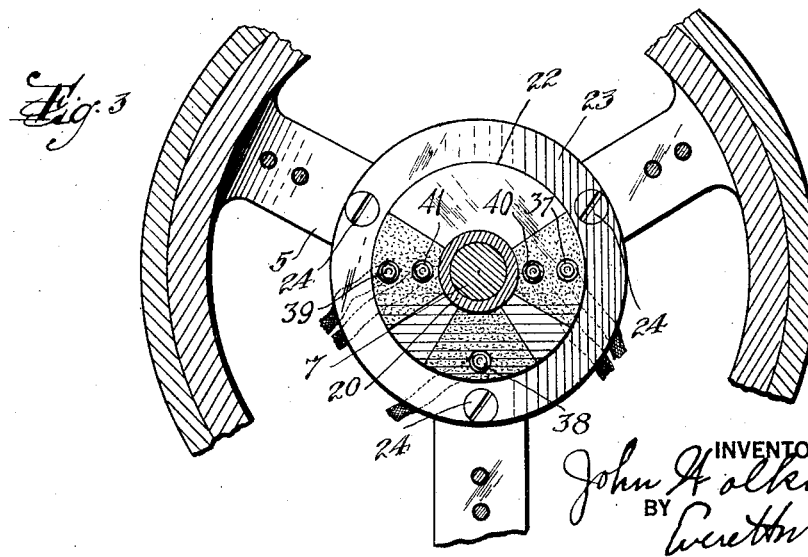

May 3, 1932.  J. WOLKOFF  1,856,147
ELECTRIC MOTOR
Filed Dec. 2, 1930   3 Sheets-Sheet 3
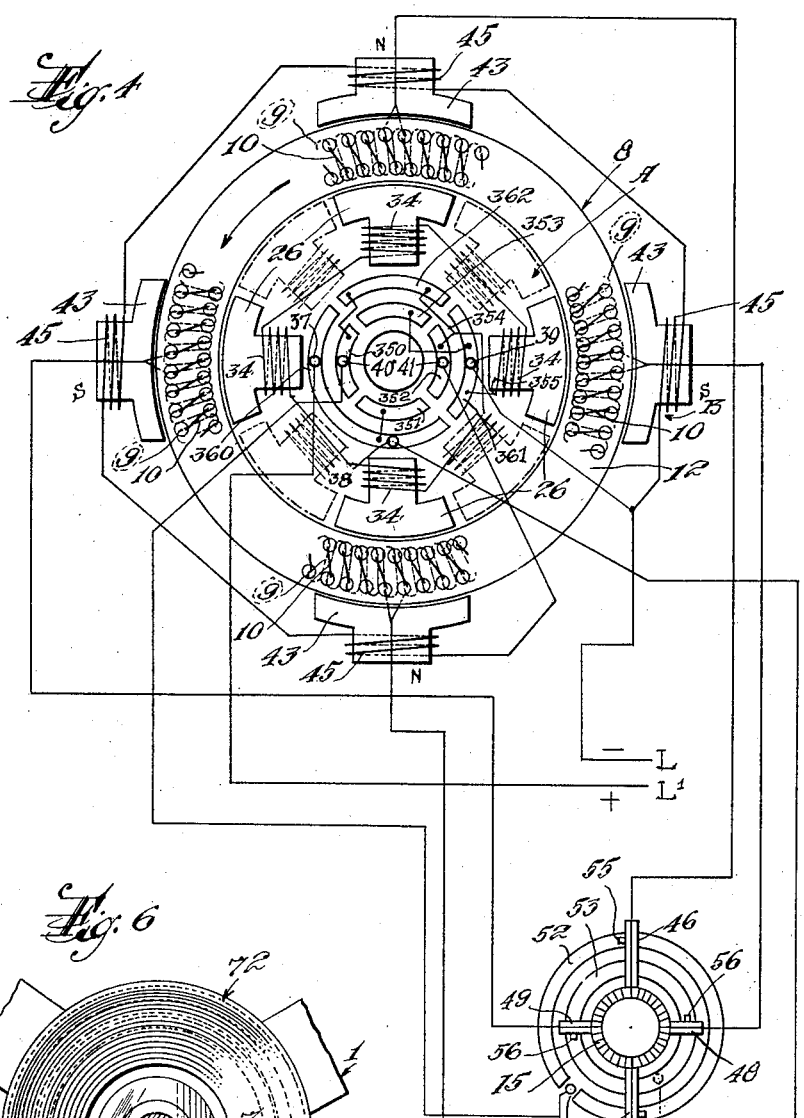
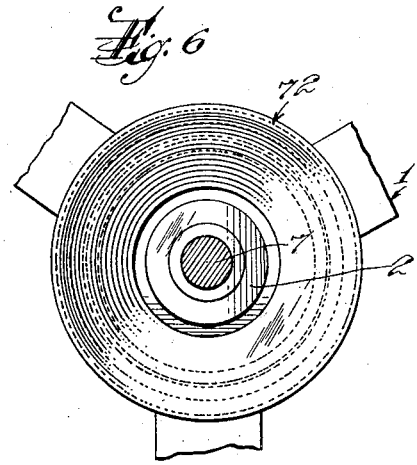

Patented May 3, 1932

1,856,147

UNITED STATES PATENT OFFICE

JOHN WOLKOFF, OF NEWARK, NEW JERSEY

ELECTRIC MOTOR

Application filed December 2, 1930. Serial No. 499,482.

In general the invention relates to a motor of the type described in my copending application Serial No. 443,036, filed April 10, 1930. In said application is disclosed and claimed a motor having an annular armature and the field divided into two sections, one section disposed within the armature coaxially therewith and the other section surrounding the armature in concentric relation thereto, said annular armature including one series of windings, and a commutator being provided with each bar thereof connected to one terminal of one armature winding and to the opposite terminal of an adjacent armature winding whereby corresponding portions of the armature have the same magnetic polarity, and at least one section of the field being laminated, the motor also including brushes cooperating with the commutator.

No broad claims to these features of construction are made in the present application, one object of the present invention being to provide a novel and improved motor including a combination of means for varying the speed of rotation of the armature by movement of the brushes, with means for varying such speed by relative movement of the two field sections, whereby minute and accurate variations in speed can be obtained.

Other objects are to provide novel and improved electrical contact means for connecting the windings of the movable field section in the circuit, for reversing the polarity of the windings and for reversing the flow of the current through the armature as the poles of the movable field section are moved into juxtaposition with the magnetically opposite poles of the other field section, to reverse the direction of rotation of the armature of the motor; and to obtain other advantages and results as will be brought out by the following description.

Referring to the accompanying drawings, in which corresponding and like parts are designated throughout the several views by the same reference characters, Figure 1 is a longitudinal sectional view through an electric motor embodying my invention, portions being shown in side elevation for clearness in illustration;

Figure 2 is a transverse vertical sectional view, on the line 2—3 of Figure 1, looking in the direction of the arrows;

Figure 3 is a similar view on the line 2—3 of Figure 1, looking in the direction opposite to that of the arrows;

Figure 4 is a wiring diagram of the motor and its connections;

Figure 5 is a transverse vertical sectional view through the governor, on the line 5—5 of Figure 1;

Figure 6 is a similar view, on the line 6—6 of Figure 1;

Figure 7 is a transverse vertical sectional view, on the line 7—7 of Figure 1;

Figure 8 is a detached perspective view of one of the laminations forming a part of the field poles of the inner section of the field, and Figure 9 is a similar view of another lamination forming a part of one of the field poles of the inner section of the field.

In its broader aspects, my invention consists in providing an electric motor having an annular armature, and a field divided into two sections, one section being disposed within the armature coaxially therewith, and the other section surrounding the armature in concentric relation thereto. Each section includes at least two opposite poles, preferably two pairs of poles, each pair arranged in a common axial plane at right angles to the plane of the other pair; and the corresponding poles of each section, for example, the north poles and the south poles of each section, are arranged in opposed relation to the north poles and the south poles of the other section. One of the sections is rotatable, preferably the inner section, so that the poles of one section can be moved relatively to the poles of the other section to vary the extent of the magnetic fields actuating the armature, so as to vary the speed of rotation of the armature. Also, the invention contemplates certain novel and improved circuit connections whereby the flow of the current passing through the windings of the movable section can be reversed upon rotation of the movable section and the circuits through the brushes changed to change the direction of flow of current through the armature when, for example, a north pole of the movable section approaches a south pole of the fixed section, so that the pole of the movable section which has been a north pole is changed to a south pole, whereby the direction of rotation of the armature can be changed.

In a motor embodying my invention the armature is subjected to magnetic forces from both the inner side and the outer side of the armature, due to the inner and outer field sections, and accordingly with the invention a motor of high power relative to the size thereof can be obtained.

While I have shown and described my invention as embodying certain details of construction, it should be understood that this is primarily for the purpose of illustrating the principles of the invention and that the invention may be embodied in other types of motors and in other details of construction without departing from the spirit or scope of the invention.

Specifically describing the illustrated embodiment of the invention, the reference character 1 designates the frame of the motor which is of the usual construction and provided at one end with a bearing 2 supported by a spider integral with the frame, and at the other end with a bearing 4 in a spider 5 separable from the frame as by screws 6 in the usual way. Within the frame and journaled in the bearings 4 is a shaft 7 upon which is mounted an armature such as that shown and described in my copending application Serial No. 443,036, filed April 10, 1930. This armature comprises an annular or ring-like body section 8, either solid or formed of laminations of magnetic metal, and having a plurality of openings 9 extending longitudinally through the body portion and equidistantly spaced circumferentially thereof and arranged substantially radially with respect to the axis of the body portion. Within each of the openings 9 is arranged a winding or coil 10 about a core piece 11, preferably laminated, said coils or windings being insulated from the body portion in the usual way and being held against movement out of the openings by end plates 12 secured to the respective ends of the body 8 as by bolts or screws 13. These end plates are preferably perforated or spider-like in form so as to permit ventilation of the coils 10. The coils 10 are connected in series as usual and each coil is connected through a conductor 14 to one bar of the commutator which consists of the usual annularly arranged and insulated bars 15. The commutator is concentric with the shaft 7 and is shown as mounted on a sleeve 16 having radial arms 17 which are connected by bolts 18 to one of the end plates 12, whereby the armature body 8 is mounted on the shaft 7. Obviously the sleeve 16 must be fast on the shaft so that the shaft will rotate with the armature.

The field of the motor includes an inner section A mounted on the end spider 5 and disposed coaxially with the armature 8 at the inside thereof, and an outer section B which is secured to the frame 1 at the outside of the armature and concentric therewith. The inner section A consists of a base 19 formed of insulating material, such as fiber, and rotatably mounted upon a bushing 20 projecting inwardly from the spider 5. To one side of this base 19 is secured a ring worm wheel 21 which is rotatable upon a bearing boss 22 on a bearing plate 23 secured to the end spider 5 as by screws 24 and insulated therefrom. The worm wheel is also held against movement in an axial direction by any suitable means such as clips 25 secured to the end spider and overlying the worm wheel. At the edge of the base 19 are a plurality of pole shoes 26 formed of laminations and arcuate concentrically with the shaft 7, as shown in Figures 4 and 9. The laminations of the pole shoes 26 may be secured to the base portion by rivets or the like 27. Supported within the pole shoes preferably in snug frictional but separable contact therewith, is a core section 28 formed of substantially cross-shaped laminations 29 each having a ring-like portion 30 and radial arms 31. These laminations are secured together by rivets 32. This core section has a central opening 33 to loosely receive the shaft 7 of the motor and the bushing 23, and when in operation the core section is slipped within the pole shoes 26 with one of the arms 31 frictionally but separably engaging each of the pole shoes. Around each of the arms of the core section is a winding or coil 34. As shown on the drawings, there are four pole shoes arranged in two pairs which are disposed at substantially right angles to each other, diametrically opposite pole shoes being similar and complemental, that is, north or south poles. The coils 34 are connected in series with each other.

For connecting the windings 34 in the circuit, the outer side of the base 19 has secured therein two sets of arcuate contact bars, each set being concentric with the other and the shaft 7. The inner set includes the bars 350, 351, 352 and 353 which are insulated and equidistantly spaced from each other at their ends with each arranged with its central radial line coincident with the median radial line of one of the inner field poles 26. The other set includes the arcuate bars 360, 361 and 362, the first of which is approximately semi-circular and arranged symmetrically with respect to the median radial lines of two adjacent inner field poles, while each of the other bars is arranged with its central median line coincident with the median radial line of one of the other two poles.

Cooperating with the outer sets of contact bars are three identical spring contactors, 37, 38 and 39, one of which is shown in Figure 1 and is arranged on the vertical median line of the inner field beneath the shaft, while the other two are arranged at opposite sides of the shaft on the horizontal diametrical line of the shaft. Two other identical contactors 40 and 41 cooperate with the inner set of contact bars and are arranged on the horizontal diametrical line of the shaft. Each contactor has a binding post 42 for connection with a wire to form a circuit.

The contact bars are connected together and to the inner field winding 34, and the contactors are shown as connected in circuit so that the two field sections are in parallel and each in series through the brushes with the armature windings; and the connections are such that when the inner field section is rotated to move the inner field poles from the corresponding outer field poles to the other outer field poles, the direction of flow of current through the inner field windings and the armature are reversed.

More specifically, the outer contact bars 360, 361 and 362 are shown electrically connected at 363, 364 and 365 with the respective inner bars 351, 353 and 350. Both the outer bar 362 and the inner bar 352 are connected to one terminal of the inner field windings 34 at 354, while both the outer bar 361 and the inner bar 353 are connected to the other terminal of the inner field windings at 355.

The outer field section includes four poles 43 arranged in two pairs, one pole of each pair being arranged directly opposite the corresponding pole of the inner field section; that is, each north pole of the outer field section is arranged at the opposite side of the armature from one north pole of the inner field section. These poles 43 are secured to the frame of the motor as by screws 44. Around each of the poles 43 is a winding 45, and these windings are connected in series with each other.

The contactor 39 is connected to one terminal of the outer field winding and to one line wire L. The other contactor 41 is connected to the other terminal of the outer field winding, while the contactor 37 is connected to the other line wire D′. The contactor 40 is connected to one pair of brushes, while the contactor 38 is connected to the other pair of brushes, through a brush-actuated contacting and switch mechanism hereinafter described.

The motor is provided with four brushes 46, 47, 48 and 49, adjacent brushes being arranged at substantially right angles to each other, and the diametrically opposite brushes being connected to the same side of the circuit. These brushes are mounted upon a disc 50 of insulation rotatable upon a bushing 51 secured to the bearing 2 of the motor, and the disc is arranged to rotate so that the brushes may be rotated about the commutator.

At the side of the disc 50 opposite the brushes are two conducting bars 52 and 53 concentric with each other and the disc. The outer bar 52 is split at 54, while the inner bar 53 is continuous. Two of the brushes, in the present instance the brushes 46 and 47, are electrically connected as by wires 55 to the bar 52, while the other brushes are connected as by wires 56 to the other bar 53.

With the outer bar 52 cooperates a spring contact stud 57 mounted in the end spider and electrically connected to the contactor 40, as shown in Figure 4, where the field sections are shown as connected in parallel. A similar spring stud 58 cooperates with the other conducting bar 53 and is connected to the contactor 38. As shown in Figure 4 of the drawings, the armature windings are connected to the respective commutator bars.

Preferably the spring contact studs 57 and 58 are mounted in a second disc 59 of insulation secured against movement upon the spider 3 as by screws 60. Obviously the contact studs and the springs 61 are insulated from the frame of the motor by cups 62 formed of insulating material in which the springs are mounted and the studs are slidable.

One of the brushes, preferably the upper one, is provided with a handle for rotating the brush-supporting disc 50.

For rotating the inner field section B, I provide a worm 63 mounted on a shaft 64 journaled in the end spider 5 and meshing with a worm wheel 21. The outer end of the shaft 64 has a hand wheel 65 for rotating the shaft.

The operation of the motor will be understood from the foregoing, but it may be generally described as follows. With the parts located as shown in Figures 1 and 4 of the drawings, the contact stud 57 is located between the ends of the contact bar 52 and out of electrical contact with the bar so as to break the circuit through the motor. This construction thus serves as a switch. Upon rotation of the disc in one direction, the circuit is closed by contact of the stud 57 with the bar 52 and the armature starts to rotate in one direction. Assuming the brushes to be in the neutral position shown in Figure 4, when the brushes are rotated in the other direction, the armature is rotated in the direction opposite to that first described. The speed of rotation of the armature can be varied by rotating the brushes toward and from the neutral point. Therefore, both the direction of rotation of the armature and the speed thereof may be controlled by simple movement of the brushes, and furthermore when the brushes are in neutral position the circuit is automatically broken by disengagement of the bar 52 from the contact stud 57.

The speed and direction of rotation of the armature may also be varied by rotation of the inner field section B. With the current closed, contact of the stud 57 with the bar 52, and the inner poles arranged directly opposite the corresponding outer poles and the brushes, as shown in Figure 4, rotation of the inner field section by turning of the hand wheel 65 will cause variations in the speed of rotation of the armature due to the movement of the poles of the inner sections out of alinement with complemental poles of the outer sections which changes the magnetic fields affecting the armature windings. When the north poles of the inner field section reach a position slightly nearer to south poles of the outer section than to the north poles of the outer section, the armature will stop unless the polarity of the magnetic fields is changed. In accordance with the invention, the direction of flow of current through the inner field windings is changed by the change in the relation between the contactors 37, 38, 39, 40 and 41 and the contact bars 350—353 and 360—362. At the same time, the flow of current through the brushes is changed. Specifically, poles of the inner section which have been north poles when moved to points opposite the south poles of the outer sections, are changed to south poles which are opposite the south poles of the outer section, and the armature would continue to rotate in the same direction it was rotating at the beginning of movement of the inner field section, unless the flow of current through the armature were changed; but the direction of flow of current through the armature is changed so as to reverse the direction of rotation of the armature simultaneously with the change in polarity of the inner field windings. It will be noted that when the poles of the inner field section are arranged midway between the poles of the outer field section, the contactors 37—41 are so related to the contact bars as to open the circuit.

Obviously, if desired, the rotatable brushes and the switch and the circuit control mechanism including the contact bars 52 and 53 and the contact studs 57 and 58, may be omitted, and the usual fixed brush mechanism utilized instead.

Furthermore, the outer section of the field might be rotated instead of the inner section to accomplish the same result. It will also be understood by those skilled in the art that the motor is adapted for use with either alternating current or direct current.

My invention enables the accurate and minute control of the speed of rotation of the armature of the motor. Where it is desired to ensure absolute and constant speed of rotation of the armature, I may utilize a governor. Such a governor is shown in Figures 5, 6 and 7 of the drawings, and comprises a cup-shaped shoe carrier 66 secured against rotation upon the end of the shaft 7 by screws 67 and 68. Within the rim of this shoe carrier are arranged in chordal relation a pair of guide rods 69, one at each side of the axis of the carrier, and slidable upon these guide rods are a pair of brake shoes 70, one at each side of the axis of the carrier. Compression springs 71 are interposed between the brake shoes and the rim of the carrier to normally influence the brake shoes toward the axis of the shaft. These brake shoes cooperate with an annular brake disc 72 coaxial with the shaft 7, and substantially frusto-conical in configuration and inclined inwardly toward the axis of the shaft 7 away from the brake shoes 70. This brake disc is adjustable toward and from the brake shoes and is shown as formed with an annular flange 73 screw threaded upon a support member 74 rigidly secured to the frame of the motor. A compression spring 75 is interposed between the brake disc and the support member 74 to frictionally hold the disc against rotation in adjusted position.

As the shaft 7 rotates, centrifugal action causes the brake shoes 70 to move outwardly from the axis of the shaft into engagement with the brake disc 72, whereby the shaft is held against rotation beyond a predetermined speed.

While I have shown and described the invention as embodied in a certain type of motor and in certain details of construction, it should be understood that this is primarily for the purpose of illustrating the principles of the invention, and that the invention can be utilized in other types of motors and many modifications and changes may be made in the details of construction without departing from the spirit or scope of the invention.

Having thus described the invention, what I claim is:

1. A dynamo-electric machine comprising a frame, a shaft journaled therein, an annular armature including windings mounted on said shaft, opposed field poles and windings each comprising two juxtaposed sections, one section disposed within the armature and the other section arranged outside the armature, means mounting the inner or outer sections of both of said field poles for rotation relative to the other sections concentrically with said armature, a commutator connected to said armature winding, a pair of brushes concentric with and engaging said armature, and means for connecting said field windings and said brushes in circuit and for reversing the flow of electricity through the windings of one section of each pole and through said armature as the second-mentioned sections approach the other sections of the other poles.

2. The machine set forth in claim 1 with the addition of means for rotatably mounting said brushes concentric with said commutator.

3. A dynamo-electric machine comprising a frame, a shaft journaled therein, an annular armature including windings mounted on said shaft, opposed field poles and windings each comprising two juxtaposed sections, one section disposed within the armature and the other section arranged outside the armature, means mounting the inner or outer sections of both of said field poles for rotation relative to the other sections concentrically with said armature, a commutator connected to said armature winding, a pair of brushes concentric with and engaging said armature, two sets of arcuate contact bars secured on said base, each set being concentric with said shaft and composed of a plurality of arcuate sections spaced apart at their ends, a plurality of spring contactors to cooperate with each of said sets of contact bars, means connecting certain of said contact bars and certain of said contactors in circuit with said field windings, and means for connecting others of said contactors to said brushes so as to reverse the flow of electricity through the windings of one section of each pole and through said armature as the second-mentioned sections approach the other sections of the other poles.

4. A dynamo-electric machine comprising a frame, a shaft journaled therein, an annular armature including windings mounted on said shaft, opposed field poles and windings each comprising two juxtaposed sections, one section disposed within the armature and the other section arranged outside the armature, means mounting the inner or outer sections of both of said field poles for rotation relative to the other sections concentrically with said armature, means for connecting said field windings in circuit and for reversing the flow of electricity through the windings of one section of each pole as the second-mentioned sections approach the other sections of the other poles.

5. A dynamo-electric machine comprising an armature including an annular body and one series of windings thereon, a commutator having each bar connected to one terminal of one armature winding and to the opposite terminal of an adjacent armature winding, whereby corresponding inner and outer portions of the armature body have the same magnetic polarity, rotatable brushes cooperating with said commutator, and opposed field poles and windings each composed of two juxtaposed sections, one section within the armature and the other section outside the armature, at least one section of one pole and the corresponding section of the other pole being laminated, and means mounting the inner or outer sections of both of said field poles for rotation relative to the other sections concentrically with said armature.

JOHN WOLKOFF.